United States Patent
Khavari (10) Patent No.: US 9,262,750 B2
(45) Date of Patent: Feb. 16, 2016

(54) SYSTEM AND METHOD FOR CREATING AN EFFICIENT AND SCALABLE CACHE MODE FOR A COLLABORATION SUITE APPLICATION

(75) Inventor: Sam Khavari, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1168 days.

(21) Appl. No.: 12/049,116

(22) Filed: Mar. 14, 2008

(65) Prior Publication Data
US 2009/0234911 A1 Sep. 17, 2009

(51) Int. Cl.
*G06F 15/16* (2006.01)
*G06Q 10/10* (2012.01)
*H04L 29/08* (2006.01)

(52) U.S. Cl.
CPC .......... *G06Q 10/107* (2013.01); *H04L 67/2842* (2013.01)

(58) Field of Classification Search
CPC .......................... G06Q 10/107; H04L 67/2842
USPC ........................................................ 709/248
See application file for complete search history.

(56) References Cited

U.S. PATENT DOCUMENTS

| | | | |
|---|---|---|---|
| 6,356,937 B1 | 3/2002 | Montville et al. | |
| 6,779,019 B1 * | 8/2004 | Mousseau | H04W 4/02 340/7.21 |
| 7,194,514 B1 * | 3/2007 | Yen | H04L 12/583 709/206 |
| 2003/0054810 A1 * | 3/2003 | Chen | H04L 12/5895 455/422.1 |
| 2005/0055426 A1 * | 3/2005 | Smith | G06F 17/30902 709/219 |
| 2007/0073720 A1 * | 3/2007 | Clarke | G06F 9/546 |
| 2009/0094332 A1 * | 4/2009 | Schemers, III | G06Q 10/107 709/206 |
| 2009/0100010 A1 * | 4/2009 | Dargahi | G06Q 10/00 |

FOREIGN PATENT DOCUMENTS

WO    WO 2007035680 A1 *  3/2007 ............. G06Q 10/06

* cited by examiner

*Primary Examiner* — Jude Jean Gilles
*Assistant Examiner* — Jaren M Means (57) ABSTRACT

A system and method for creating a cached mode is created for some applications, such as for use with BES. Operations on the mailbox items are conducted off the cache, rather than off the collaboration suite server itself, thus reducing the load on the collaboration suite server. According to one aspect of the present invention, a filtered initial synchronization is performed with the cache in the client device to further reduce the load on the collaboration suite server as well as the required bandwidth. In one embodiment of the present invention, mailbox items on the local cache are periodically reaped so as to not over-burden the disk space in the client device. In one embodiment of the present invention, mailbox items not present in the cache can be requested on-demand from the collaboration suite server.

18 Claims, 4 Drawing Sheets

SYSTEM AND METHOD FOR CREATING AN EFFICIENT AND SCALABLE CACHE MODE FOR A COLLABORATION SUITE APPLICATION

BACKGROUND OF THE INVENTION

1. Field of the Invention

This invention relates generally to collaboration suite applications, and more particularly, to collaboration suite functionality in a client-server architecture.

2. Description of the Related Art

Collaboration suite applications typically include functionality such as email messaging, calendaring, and contact storage and retrieval, where email messages, calendar appointments, contacts, tasks, folders, documents, files, etc. are commonly referred to as "mailbox items." The ZIMBRA COLLABORATION SUITE® from Zimbra, Inc. (San Mateo, Calif.), MICROSOFT EXCHANGE® and MICROSOFT OUTLOOK® from Microsoft Corp. (Redmond, Wash.), LOTUS NOTES® from IBM (Armonk, N.Y.) are examples of collaboration suite applications. YAHOO! MAIL® from Yahoo! Inc. (Sunnyvale, Calif.) and GMAIL® from Google Inc. (Menlo Park, Calif.) are e-mail applications which are also part of collaboration suites.

A collaboration suite application sometimes has a client-server architecture, where the client portion resides on a user device. The user device can include a personal computer, a MAC® computer, various handheld devices including personal digital assistants (PDAs) such as a TREO® device from Palm, Inc. (Sunnyvale, Calif.) a BLACKBERRY® device from Research In Motion Limited (Canada), a cell phone, and so on. It is to be noted that this list is in no way meant to be exhaustive.

Figure 1:
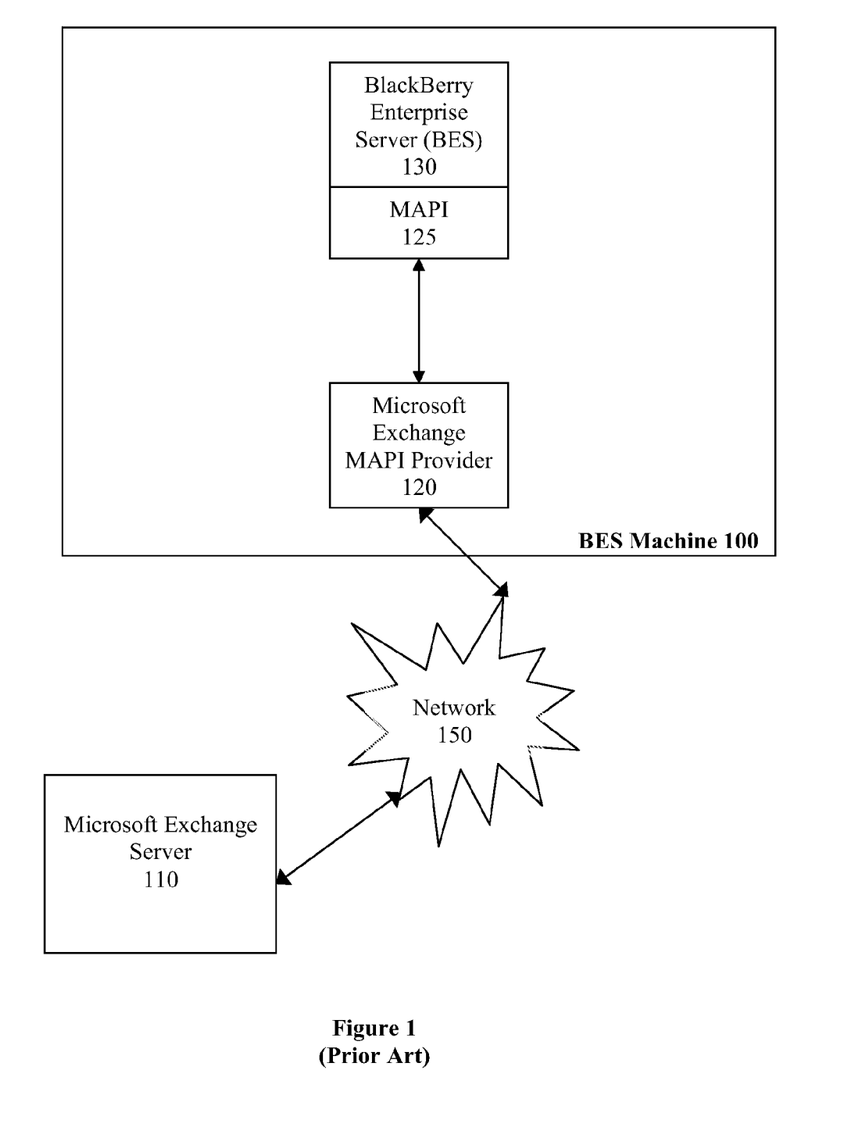
FIG. 1 is a block diagram of a prior art system showing a MICROSOFT EXCHANGE SERVER® and a BES.

As an example, the BLACKBERRY® device is discussed below in further detail. The BLACKBERRY® device is a wireless handheld device which includes the usual collaboration suite applications such as email, calendaring, contacts, to-do lists, etc. BLACKBERRY® devices are very popular with some businesses, where they are primarily used to provide e-mail access to roaming employees. To fully integrate the BLACKBERRY® device into a company's systems, the installation of BLACKBERRY ENTERPRISE SERVER® (BES) is required. FIG. 1 shows a BES machine 100, which is a client to the MICROSOFT EXCHANGE SERVER® 110. The BES machine 100 includes the BES 130 which uses MICROSOFT® Messaging API (MAPI) 125. The MICROSOFT EXCHANGE® MAPI Provider 120 also resides on the BES machine 100, and is used to communicate bidirectionally with the Microsoft Exchange Server MICROSOFT EXCHANGE SERVER® via a network 150. The BES machine 100 is typically deployed and managed within the enterprise by messaging administrators (for example, the individuals already responsible for managing MICROSOFT EXCHANGE®) or sometimes a dedicated IT person, usually called the BLACKBERRY® or BES Administrator. It is to be noted that the architecture described with respect to FIG. 1 may be equally applicable to other collaboration suite servers (e.g., LOTUS DOMINO® Servers from IBM (Armonk, N.Y.), GROUPWISE® from Novell (Waltham, Mass.), etc.).

BES 130 can act as a sort of e-mail relay for corporate accounts so that users always have access to their mailbox items. The software monitors the mailbox on the MICROSOFT EXCHANGE SERVER® 110 via MAPI 120, and when a new message comes in, it picks up the message and the messages are then relayed to the user's wireless provider (not shown in FIG. 1), which in turn delivers them to the user's BLACKBERRY® device (not shown in FIG. 1).

In such a scenario, the MICROSOFT EXCHANGE SERVER® 110 experiences additional load because all of the operations that the BES 130 conducts (e.g., those requested by the user) are conducted off the collaboration suite server 110. Additional load is generated by any read or search operation. Examples of such operations include the user device fetching attachment content, the device executing searches or filters on the collaboration server, the device fetching large message bodies, the device needing to resynchronize its contents, and so on.

It is to be noted that the BES's 130 responsibility for synchronizing multiple mailboxes and devices (not shown) aggravates the problems discussed above.

A cache mode, where a local cache of your mailbox is stored (e.g., on a user device) is available for some programs. For instance, in MICROSOFT OUTLOOK 2003®, cached mode is a mechanism that keeps users' MICROSOFT EXCHANGE SERVER® mailboxes synchronized with offline folders that reside on their local hard disks. When MICROSOFT OUTLOOK® is used with a MICROSOFT EXCHANGE SERVER® 110 e-mail account, a copy of the user's mailbox is stored on the user's computer. This copy provides quick access to data and is frequently updated with the mail server. This provides for a better user experience. If the user works offline, whether by choice or due to a connection problem, his data is still available to him instantly wherever he is, even if a connection from the user's computer to the computer running Exchange server isn't available.

There are several limitations on such existing cache modes. For one thing, a cache mode is not available for scenarios where the mailboxes of multiple users need to be synchronized (e.g., using BES). In particular, the need to synchronize multiple mailboxes and devices leads to the need for the more efficient and scalable cached mode requirement. Not having a cache mode leads, as discussed above, to an increased load on the collaboration suite server. It also leads to a less reliable user experience. Moreover, even in cases where the cached mode does exist, as the size of a user's mailbox gets large, the large size of the caches can lead to disk capacity and performance issues. Further, the size of the user's mailbox is relevant in some cases (e.g. MICROSOFT OUTLOOK®) because an .OST file is often used to store cached data. Performance of an .OST file degrades significantly as mailbox size grows, especially with multi-gigabyte mailboxes. Moreover, for existing cache modes, the initial synchronization between the caches and the Collaboration Suite Server puts a significant load on network bandwidth and on the Collaboration Suite Server. For instance, with MICROSOFT OUTLOOK® cache mode, during the initial synchronization, all pre-existing MICROSOFT EXCHANGE® data has to be copied from the MICROSOFT EXCHANGE SERVER® to the .OST file being used for a user's cache. Further, there is no seamless periodic deletion of mailbox items across various folders, unless the user sets such filters for each folder individually. Moreover, there is no ability to get an individual mailbox item "on-demand" from the server if it is not stored on the cache.

There is thus a need for a cached mode for some applications to manage the load on the collaboration suite server. Further, there is a need for an efficient and scalable cached mode for synchronizing multiple mailboxes for multiple users of a collaboration suite application with their user devices. Further still, there is a need to manage the initial synchronization between the collaboration suite server and the cache. Moreover, there is a need for the ability to reap simply and easily across the user's mailbox. Furthermore, there is a need to obtain on demand mailbox items which are not in the cache.

BRIEF SUMMARY OF THE INVENTION

According to one aspect of the present invention, a cached mode is created for some applications (e.g., for use with the BES) to manage the load on the collaboration suite server in a multi-user scenario. Operations on the mailbox items are conducted off the cache, rather than off the collaboration suite server itself, thus reducing the load on the collaboration suite server.

In accordance with an embodiment of the present invention, a more efficient cache mode is created for collaboration suite applications. In accordance with an embodiment of the present invention, an efficient and scalable cached mode provides for synchronization of multiple mailboxes of multiple users of a collaboration suite application with their multiple user devices.

According to one aspect of the present invention, a filtered initial synchronization is performed with a local cache. In one embodiment, the cache is on the client device. In one embodiment, the client device is a mobile device (e.g., a BLACKBERRY® device). In one embodiment, the client device is user's host computer (e.g., a PC, a MAC®, a laptop, etc.). In another embodiment, the local cache is on a synchronization server, which synchronizes data for multiple users' mailboxes. The filtered initial synchronization is based on filters regarding to factors such as how many days worth of data should be downloaded etc. Such a filtered initial synchronization avoids use of large amounts of disk space in the client device (which would occur by simply transferring all the data from the collaboration suite server into the local cache). Further, such a filtered initial synchronization reduces the required bandwidth as well as the load on the collaboration suite server.

In one embodiment, this filtered initial synchronization is non-blocking. That is, new mailbox items received by the collaboration suite server are added to the cache even while the initial synchronization (filtered or non-filtered, depending on the embodiment) is ongoing. In one embodiment, a secondary synchronizer is used for this purpose.

Once the initial filtered synchronization is done, data is synchronized in real-time between the user's mailbox on the collaboration suite server and the cache.

In one embodiment of the present invention, mailbox items on the local cache are periodically reaped so as to not overburden the disk space in the client device. In one embodiment, such reaping includes periodically removing data that is older than a predetermined time-period. This time-period can be determined, in one embodiment, by a system administrator. In one embodiment, this time-period can be determined by a user. For instance, in one embodiment, emails that have been received more than 7 days ago are deleted from the cache. In one embodiment, the reaped information is not removed from the collaboration suite server, but rather only from the cache. Thus the user can, in one embodiment, access a mailbox item on-demand from the collaboration suite server, even if it has been reaped from the cache. Hence the reaping is transparent to the user in that the user can access a mailbox item regardless of whether or not that mailbox item has been reaped from the cache. The user can have seamless access to a superset of the data in the cache. Such reaping is, in accordance with an embodiment of the present invention, transparent to the synchronization server.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The invention has other advantages and features which will be more readily apparent from the following detailed description of the invention and the appended claims, when taken in conjunction with the accompanying drawing, in which:

DETAILED DESCRIPTION OF THE INVENTION

The figures (or drawings) depict a preferred embodiment of the present invention for purposes of illustration only. It is noted that similar or like reference numbers in the figures may indicate similar or like functionality. One of skill in the art will readily recognize from the following discussion that alternative embodiments of the structures and methods disclosed herein may be employed without departing from the principles of the invention(s) herein. It is to be noted that while some portions of the following discussion focus on the BLACKBERRY® device and the BES, the present invention is in no way limited to these.

Figure 2:
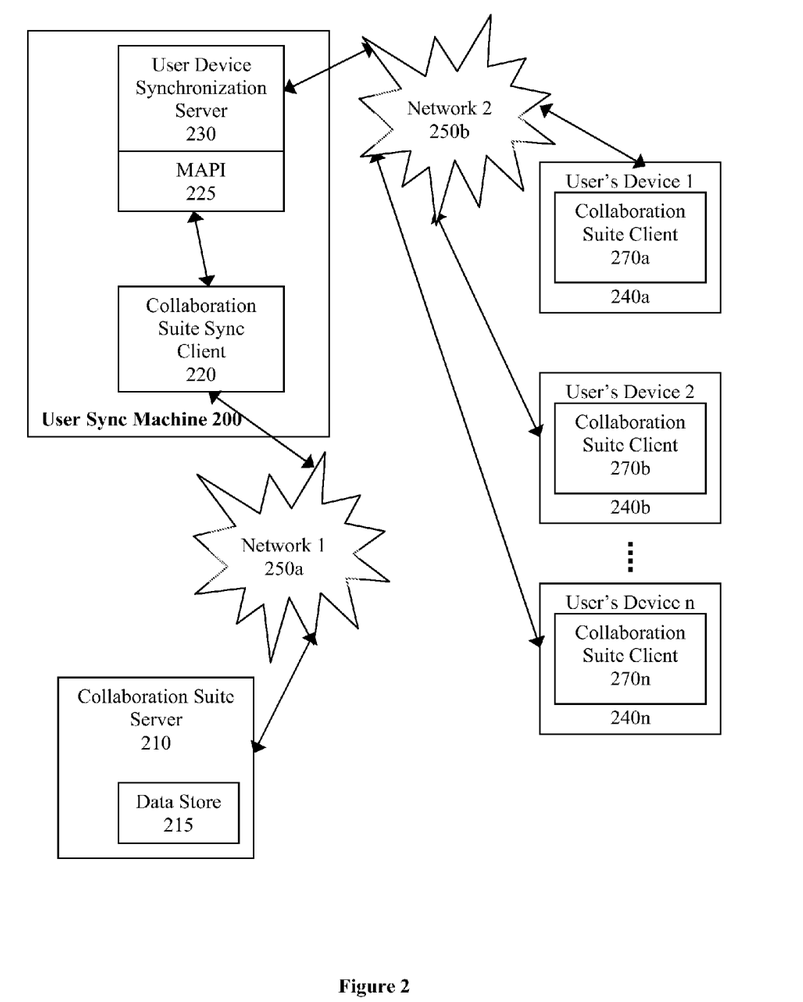
FIG. 2 is a block diagram of a system in accordance with an embodiment of the present invention.

FIG. 2 is a block diagram of a system in accordance with an embodiment of the present invention. The block diagram includes a user synchronization machine 200, a collaboration suite server 210, a synchronization server 220, and multiple user devices 240*a* . . . 240*n*.

Collaboration suite applications typically include functionality such as email messaging, calendaring, and contact storage and retrieval, where email messages, calendar appointments, contacts, tasks, folders, documents, files, etc. are commonly referred to as "mailbox items." The ZIMBRA COLLABORATION SUITE® from Zimbra, Inc. (San Mateo, Calif.), Microsoft Exchange MICROSOFT EXCHANGE® and Microsoft Outlook MICROSOFT OUTLOOK® from Microsoft Corp. (Redmond, Wash.), LOTUS NOTES® from IBM (Armonk, N.Y.) are examples of collaboration suite applications. The collaboration suite server 210 has a data store 215, which stores mailbox items for each of the multiple users of the system. In one embodiment, the collaboration suite application has a client/server architecture, and the collaboration suite server 210 is the server in such a situation.

In one embodiment, a collaboration suite sync client 220 is the client which communicates with the collaboration suite server 210 over a network 250*a*. The collaboration suite synchronization client 220 is responsible for synchronizing the data on the collaboration suite server 210 with the different user devices. As can be seen from FIG. 2, the collaboration suite sync client 220 resides on the user synchronization machine 200, and communicates via MAPI 225 with the user device synchronization server 230. (It is to be noted that the user synchronization machine 200 can be split across several physical machines/servers.) The collaboration suite synchronization client 220 is discussed in greater detail below with reference to FIG. 3.

In one embodiment, the user device synchronization server 230 functions as the server for the collaboration suite client on a user devices 240a . . . 204n, which are described in further detail below. The user device synchronization server 230 communicates with the collaboration suite synchronization client 220 using MAPI 225. The BLACKBERRY ENTERPRISE SERVER® from RIM and the GOODLINK SERVER® from Motorola (Schaumburg, Ill.) are examples of the user device synchronization server 230.

Network 1 250a and Network 2 250b can be any networks, such as a Wide Area Network (WAN) or a Local Area Network (LAN), or any other network, such as a wireless phone network. A WAN may include the Internet, the Internet 2, and the like. A LAN may include an Intranet, which may be a network based on, for example, TCP/IP belonging to an organization accessible only by the organization's members, employees, or others with authorization. A LAN may also be a network such as, for example, Netware™ from Novell Corporation (Provo, Utah) or WINDOWS NT® from Microsoft Corporation (Redmond, Wash.). The network 350 may also include commercially available subscription-based services such as, for example, AOL® from America Online, Inc. (Dulles, Va.) or MSN® from Microsoft Corporation (Redmond, Wash.). In one embodiment, Network 1 250a and Network 2 250b are different from each other. For instance, in one embodiment, Network 1 350a is the Internet, while Network 2 250b is a wireless phone network. In another embodiment, Network 1 250a and Network 2 250b are the same. In one embodiment, Network 1 250a and/or Network 2 250b are combinations of two or more different types of networks (e.g., Internet and phone network).

The user devices 240a-240n, in one embodiment, are various handheld devices. These can include personal digital assistants (PDAs) such as a TREO® device from Palm, Inc. (Sunnyvale, Calif.), a BLACKBERRY® device from Research In Motion Limited (Canada), a cell-phone, and so on. The user device can also be a user's desktop or laptop computer (e.g., PC or MAC®). It is to be noted that this list is in no way meant to be exhaustive. Each of the user devices 240a-n has an instance of the collaboration suite client 270a-n on it.

Figure 3:
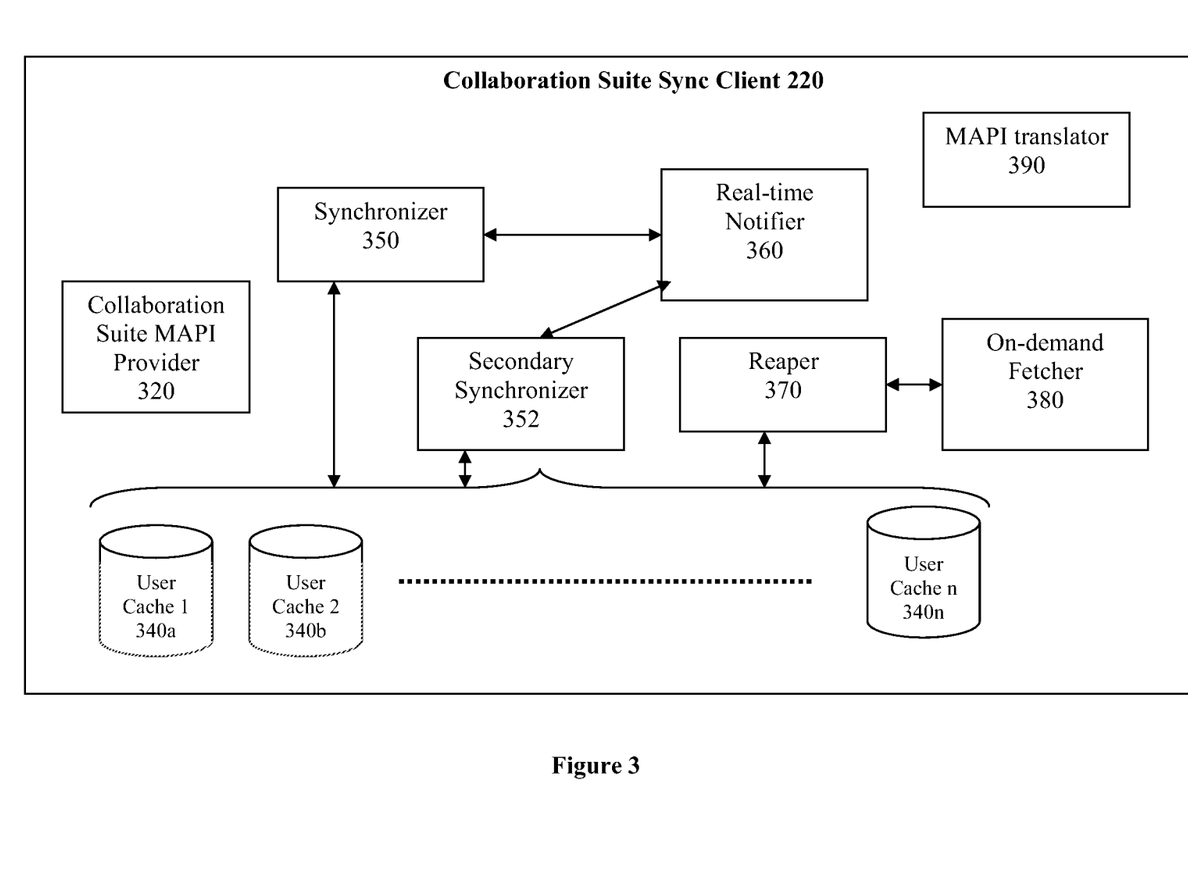
FIG. 3 is a block diagram of a collaboration suite synchronization client for a system with multiple users of a collaboration suite application in accordance with an embodiment of the present invention.

FIG. 3 shows the collaboration suite synchronization client 220 in greater detail. It is to be noted that not all the components of the collaboration suite synchronization client 220 are shown here, for ease of understanding and simplicity. Furthermore, not all the connections between the various components included in the figure are shown in FIG. 2.

The collaboration suite synchronization client 220 includes the collaboration suite MAPI provider 320, user caches 340a . . . 340n (collectively 340), a synchronizer 350, a secondary synchronizer 352, a real-time notifier 360, a reaper 370, an on-demand fetcher 380, and a MAPI translator 390.

The user caches 340a . . . 340n each correspond to a mailbox. The use of these caches 340a . . . 340n for multiple mailboxes reduces the load on the collaboration suite server 210, as described above. The user devices 240a . . . 240n are synchronized with the corresponding user caches 340a . . . 340n using the user device synchronization server 230.

The synchronizer 350 and the secondary synchronizer 352 synchronize the data for a particular user in the data store 215 with the corresponding user cache 340a . . . n. This is described in further detail with reference to FIG. 4 below.

The synchronizer communicates with the real-time notifier 360, which communicates with the collaboration suite server 210, to be notified of any real-time changes to the mailbox (e.g., new mail messages received).

The reaper 370 periodically reaps the various user caches 340a . . . 340n so as to not overload the user synchronization machine 200. Thus mailbox items are systematically removed from user caches 340a . . . 340n. For instance, emails older than a certain date (e.g., older than 7 days) are deleted from the local cache 340a . . . 340n. In one embodiment, such reaping is transparent to the user in that a user can access any of his/her mailbox items from user device 240a . . . 240n, regardless of whether or not it is on the user cache 340a . . . 340n. This is done, in one embodiment, by communicating with the on-demand fetcher 390, which fetches from the data store 215 on the collaboration suite server 210, any mailbox item requested by a user which has been reaped from the user cache 340a . . . 340n. This is described in greater detail below with reference to FIG. 4.

The MAPI translator 390 translates commands etc. to and from MAPI, prior to communication with the collaboration suite server 210.

The functionality of the various modules shown in FIG. 3 is described in greater detail below with reference to FIG. 4.

Figure 4:
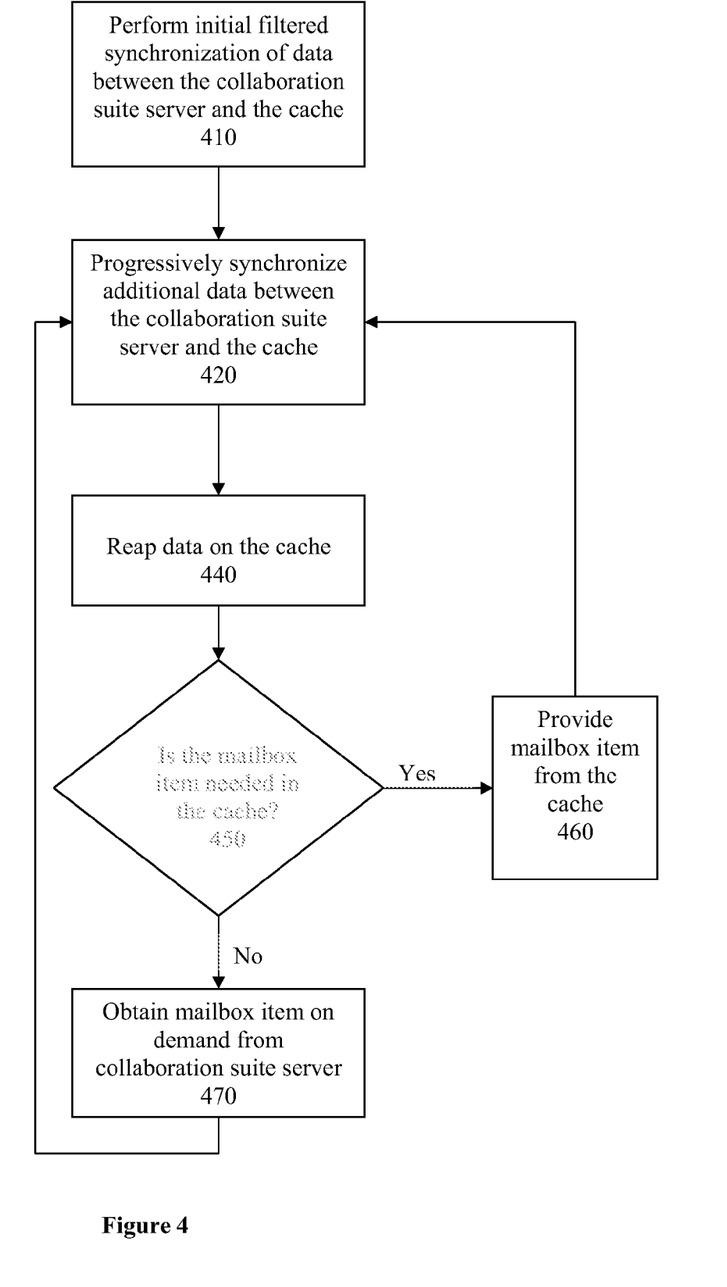
FIG. 4 is a flowchart which outlines some of the steps taken by a system in accordance with an embodiment of the present invention.

FIG. 4 is a flowchart which outlines some of the steps taken by a system in accordance with an embodiment of the present invention. An initial filtered synchronization (step 410) is performed between the collaboration suite server 210 and the caches 340. This initial filtered synchronization is discussed further below.

Some or all of the data in the data store 215 for user n needs to be synchronized with the cache 340n. In accordance with an embodiment of the present invention, the initial synchronization of the user n's data in data store 215 with the cache 340n is filtered. All of the data for user n in the data store 215 is not synchronized with the cache 340n. Instead, a subset of the data in the user's mailbox is synchronized with the cache 340n. In one embodiment, the filters relating to what data should be downloaded onto the cache 340 are set by the user. In one embodiment, such filters are set by a system administrator. The filters can have one or more parameters, such as how old the data is. For instance, data in the user's mailbox that is older than 7 days may not need to be downloaded to the cache 340. In one embodiment, a filter is applied only to certain types of mailbox items (e.g., emails, calendar entries, etc.), while other types of mailbox items (e.g., contacts, notes, etc.) are not filtered. In one embodiment, another type of filter controls which mailbox items are retrieved based on the folder that contains the item. Having an initial synchronization that is filtered has several advantages. For instance, the synchronizing the entire mailbox for each user on the collaboration suite server 210 and the caches 340a . . . 340n puts a significant load on network bandwidth and on the collaboration suite server 210; a filtered initial synchronization avoids such loads. Furthermore, synchronizing each user's entire mailbox with the cache 340 makes for a very large size of each cache 340a . . . 340n, which can cumulatively impact the collaboration suite synchronization client 220. Another benefit of the filtered initial synchronization is that it reduces the amount of time required to populate the local cache 340.

Once the initial synchronization is performed, the required data from each user's mailbox is on the cache 340. These data from caches 340a . . . 340n are synchronized (not shown in FIG. 4) with the user's devices 240a . . . 240n (collectively 240) by the synchronizer 350. The synchronization with the user devices 240 may happen concurrently with the initial filtered synchronization. That is, in one embodiment, as the user's mailbox is being replicated to the local caches 340, the user device synchronization server 230 is also synchronizing the data to the user devices 240.

In one embodiment, the initial filtered synchronization (step 410) is non-blocking. That is, the local cache 340 receives any new mailbox items the user receives while the initial filtered synchronization (step 410) is ongoing. The importance of this can be easily understood by considering the following scenario. Let us assume that a user has a few thousand mailbox items that will be handled during the filtered initial synchronization (step 410). This may take a few minutes to execute. During this time, new messages may be received in the user's mailbox. Although the synchronizer 350 is busy completing the filtered initial synchronization (step 410), a secondary synchronizer 352 ensures that these new messages are received by the cache 340 in real-time. This secondary synchronizer 352 gets notified by the server in real-time (via the real-time notifier 360) when new items arrive in the user's mailbox and it adds these mailbox items to the caches 340 in real-time. This is especially important for some cases (e.g., the BES) because over-the-air provisioning is done via email. So, as an example, when the user's administrator provisions a BES account for the user, the user does not need to wait for the cache 340 on the BES to be fully synchronized before he can provision his device 240. Rather, he can provision it right away.

As explained above, in one embodiment, this secondary synchronization process (not shown in FIG. 4) is also running while the initial filtered synchronization (step 410) is proceeding. This secondary synchronization makes sure that the local cache 340 receives any new mailbox items for the user received on the collaboration suite server 210. This occurs in real time.

Once 410 has completed, based on real-time local and server notifications (via the real-time notifier 360), progressive synchronization (not shown) occurs between the caches 340 and the collaboration suite server 210, so that any changes are reflected in the caches 340 and the collaboration suite server 210 with as little delay as possible.

Since the user device synchronization server 230 conducts all its operations against the local caches 340, the load on the collaboration suite server 210 is vastly reduced. The collaboration suite server 210 only needs to synchronize with the caches 340, which creates much less load on it than passing through all the user device synchronization server 230 operations (e.g., searching, sorting, etc. of mailbox items) directly to the collaboration suite server 210.

As new data is added to the data store 215 on the collaboration suite server 210 for each user, these data are progressively synchronized in real time (step 420) with the corresponding cache 340a . . . 340n. In one embodiment, the collaboration suite server 210 notifies the collaboration suite synchronization client 220 when a new mailbox item is received by it. Similarly, the collaboration suite synchronization client 220 notifies the collaboration suite server 210 when a new mailbox item is received by it. The caches 340 are continually synchronized (step 415) with user devices 240 by the user device synchronization server 230.

In one embodiment, the data stored in each cache 340a . . . 340n includes a mailbox revision number. A token including this revision number of the mailbox version in the caches 340a . . . 340n is passed to the collaboration suite server 210 by the synchronizer 250. The collaboration suite server 210 then checks the revision number of each mailbox against the revision number in the data store 215 corresponding to the mailbox. If the revision number in the token sent over by the synchronizer 250 is the same as the revision number in the data store 215 for that mailbox, then that mailbox does need to be synchronized at that time. If the revision number in the token is different, then something has changed since the last synchronization, and the mailbox needs to be synchronized. This prevents needless synchronization of mailboxes when nothing has changes, while at the same time ensuring timely synchronization when any change occurs.

As time goes on, the size of both the caches 340a . . . 340n, and the data on the user's devices 240a . . . 240n grows. Eventually, very large sizes of these caches 340a . . . 340n will cumulatively impact the collaboration suite synchronization client 220, and large sizes of data on the user's devices 240a . . . 240n will impact the user devices 240a . . . 240n. In order to control these sizes, in accordance with an embodiment of the present invention, reaping (step 440) is performed on these caches 340.

Reaping is the selective removal of data across various folders in a user's mailbox from the cache 340. In one embodiment, some mailbox items are reaped by the reaper 370 based on a date (e.g., date received prior to 7 days ago is deleted from cache 340) while other mailbox items (e.g., contacts) are not reaped. Still other mailbox items are reaped with more complicated criteria—for instance, calendar entries are reaped if they are older than a few days, but recurring calendar entries are not reaped.

In one embodiment, this reaping of a user's mailbox is transparent to the user of the user device 240. That is, reaped items remain on the collaboration suite server 210, and the user 240 is not aware that data has been reaped. The user can request a mailbox item which has been removed from the local cache 340 by the reaper 370, and in such a situation, the on-demand fetcher 380 will fetch the requested mailbox item from the data store 215 on the collaboration suite server 210. This is discussed in further detail below.

In one embodiment, the reaping occurs at regular intervals. As mentioned above, in one embodiment, at any given time, only data from the last several (e.g., seven days) may be kept in the cache 340. In another embodiment, the reaping may be based on the size of the cache. For instance, at any given time, the size of each cache may not exceed a predetermined size, and reaping occurs to keep the size of each cache under this predetermined size. The parameters for reaping (e.g., the periodicity of reaping) are specified by the system administrator in accordance with an embodiment of the present invention. In another embodiment, the user can specify the parameters for reaping. In one embodiment, when an item is reaped, its metadata is still viewable in the cache 340, but large properties are not. For instance, if a mailbox item includes attachments, large text message bodies, large html message bodies, etc., these are removed. So the mailbox item will be in the cache 340, but when the large fields are requested, the mailbox item will need to be refreshed from the collaboration suite server 210. (See discussion regarding obtaining mailbox items on-demand (step 470) below.) It is to be noted that, over a long period of time, the data on the device 240 will be, in one embodiment, a superset of the data in the cache 340, since many mailbox items may have been reaped from the cache 340, but are held on the device 240 depending on for how long the device 240 has been configured to hold mailbox items.

Referring back to FIG. 4, when a mailbox item is needed (e.g., the user requests a mailbox item on the user's device 240), a system in accordance with an embodiment of the present invention checks (step 450) if the needed mailbox item is on the cache 340. If the mailbox item is on the cache 340, it is provided (step 460) to the user's device 240.

It may be that the mailbox item requested by the user is not available on the cache 340. This may happen, for instance, when the user requests a much older email that is not available on the cache, either due to the filtered initial synchronization and/or due to the reaping. When this happens, the mailbox item requested is obtained on-demand (step 470) by the on-demand fetcher 380 from the collaboration suite server 210 on an as-needed basis. This happens transparently to the user device synchronization server 230. The user can thus have seamless access to a superset of the data in the cache 340.

As mentioned above, when a mailbox item is opened, or acted upon in any way, and the mailbox item is not in the cache 340, the mailbox item is fetched from the collaboration suite server 210 and refreshed in the cache 340. Any other operations that need to be conducted on this mailbox item are deferred until the current operation has completed. Operations can include simply providing the item to the user device 240, modifications of a property of the item (contact first name, appointment start time, add/remove attachment on an item, etc.), modification of the location of the item (moving it to a new folder), deletion of the item, and so on.

While particular embodiments and applications of the present invention have been illustrated and described, it is to be understood that the invention is not limited to the precise construction and components disclosed herein. The present invention is in no way limited to the BES server, or to the ZIMBRA COLLABORATION SUITE® (from the assignees of this application). For example, embodiments of the present invention may be used for any form of replication from the collaboration suite application to a third party store. For instance, a fan-out style of replication may be useful where many replicas of mailboxes are needed. Various other modifications, changes, and variations which will be apparent to those skilled in the art may be made in the arrangement, operation and details of the method and apparatus of the present invention disclosed herein, without departing from the spirit and scope of the invention as defined in the following claims. It should further be recognized by those of ordinary skill in the art that one or more embodiments of the present invention may be implemented as one or more computer programs or as one or more computer program modules embodied in one or more computer readable media.

What is claimed is:

1. A computer system comprising:
a collaboration suite server comprising source mailboxes for each of a plurality of users;
a cache store configured to store mailbox items on a plurality of distinct user-specific caches, wherein each user-specific cache of the plurality of user-specific caches: (i) corresponds to a particular mobile device configured to receive mailbox items of a corresponding user through a mobile device synchronization component, (ii) comprises a subset of data from a corresponding user source mailbox maintained at the collaboration suite server, and (iii) is synchronized with the corresponding user source mailbox, the synchronization including an initial synchronization that caches a filtered subset of the mailbox items prior to a user requesting the a mailbox item; and
a processor configured to perform the steps of:
periodically removing one or more mailbox items from the respective user-specific caches based upon a set of parameters including a respective age of the one or more mailbox items;
receiving a request for a mailbox item from the mobile device synchronization component on behalf of a mobile device;
determining whether the user-specific cache corresponding to the mobile device includes the requested mailbox item;
in response to a determination that the user-specific cache includes the requested mailbox item from the user-specific cache, providing the mailbox item to the mobile device synchronization component to provide to the mobile device without requiring interaction with the corresponding user source mailbox at the collaboration suite server; and
in response to a determination that the user-specific cache does not include the requested mailbox item, forwarding the request to the collaboration suite server.

2. The computer system of claim 1, wherein the processor is further configured to perform the steps of:
performing an initial synchronization between a user-specific cache and a corresponding user mailbox based on a set of parameters that identifies a subset of currently existing data in the corresponding user source mailbox, and
simultaneously receiving new mailbox items from the corresponding user source mailbox in real-time during the initial synchronization through a separate synchronization process.

3. The computer system of claim 2, wherein the processor is further configured to perform the step of progressively synchronizing the user-specific cache with the corresponding user source mailbox in real-time after the initial synchronization.

4. The computer system of claim 3, wherein the step of progressively synchronizing comprises periodically transmitting a mailbox revision number corresponding to the user-specific cache to the collaboration suite server and receiving updated data from the corresponding user source mailbox if the transmitted mailbox revision number does not match a second mailbox revision number maintained by the collaboration suite server for the corresponding user source mailbox.

5. The computer system of claim 1, wherein periodically removing data in the user-specific cache is based upon a set of parameters configured to maintain a size of the user-specific cache.

6. A method for reducing load on a collaboration suite server supporting access to user source mailboxes by mobile devices, the method comprising:
configuring a cache store to store mailbox items on a plurality of distinct user-specific caches, wherein each user-specific cache of the plurality of user-specific caches: (i) corresponds to a particular mobile device configured to receive mailbox items of a corresponding user through a mobile device synchronization component, (ii) comprises a subset of data from a corresponding user source mailbox maintained at the collaboration suite server, the collaboration suite server comprising source mailboxes for each of a plurality of users, and (iii) is synchronized with the corresponding user source mailbox, the synchronization including an initial synchronization that caches a filtered subset of the mailbox items prior to a user requesting a mailbox item;

periodically removing one or more mailbox items from the respective user-specific caches based upon a set of parameters including a respective age of the one or more mailbox items;

receiving a request for a mailbox item from the mobile device synchronization component on behalf of a mobile device;

determining whether the user-specific cache corresponding to the mobile device includes the requested mailbox item;

in response to a determination that the user-specific cache includes the requested mailbox item, providing the mailbox item from the user-specific cache to the mobile device synchronization component to provide to the mobile device without requiring interaction with the corresponding user source mailbox at the collaboration suite server; and in response to a determination that the user-specific cache does not include the requested mailbox item, forwarding the request to the collaboration suite server.

7. The method of claim 6, further comprising:
performing an initial synchronization between a user-specific cache and a corresponding user source mailbox based on a set of parameters that identifies a subset of currently existing data in the corresponding user source mailbox; and
simultaneously receiving new mailbox items from the corresponding user source mailbox in real-time during the initial synchronization through a separate synchronization process.

8. The method of claim 7, further comprising progressively synchronizing the user-specific cache with the corresponding user source mailbox in real-time after the initial synchronization.

9. The method of claim 8, wherein the step of progressively synchronizing comprises periodically transmitting a mailbox revision number corresponding to the user-specific cache to the collaboration suite server and receiving updated data from the corresponding user source mailbox if the transmitted mailbox revision number does not match a second mailbox revision number maintained by the collaboration suite server for the corresponding user source mailbox.

10. The method of claim 6, wherein periodically removing data in the user-specific cache is based upon a set of parameters configured to maintain a size of the user-specific cache.

11. A non-transitory computer-readable storage medium including instructions that cause a processor to reduce load on a collaboration suite server supporting access to user source mailboxes by mobile devices by performing the steps of:
configuring a cache store to store mailbox items on a plurality of distinct user-specific caches, wherein each user-specific cache of the plurality of user-specific caches: (i) corresponds to a particular mobile device configured to receive mailbox items of a corresponding user through a mobile device synchronization component, (ii) comprises a subset of data from a corresponding user source mailbox maintained at the collaboration suite server, the collaboration suite server comprising source mailboxes for each of a plurality of users, and (iii) is synchronized with the corresponding user source mailbox, the synchronization including an initial synchronization that caches a filtered subset of the mailbox items prior to a user requesting a mailbox item;
periodically removing one or more mailbox items from the respective user-specific caches based upon a set of parameters including a respective age of the one or more mailbox items;

receiving a request for a mailbox item from the mobile device synchronization component on behalf of a mobile device;

determining whether the user-specific cache corresponding to the mobile device includes the requested mailbox item;

in response to a determination that the user-specific cache includes the requested mailbox item, providing the mailbox item from the user-specific cache to the mobile device synchronization component to provide to the mobile device without requiring interaction with the corresponding user source mailbox at the collaboration suite server; and in response to a determination that the user-specific cache does not include the requested mailbox item, forwarding the request to the collaboration suite server.

12. The non-transitory computer-readable storage medium of claim 11, wherein the mobile device synchronization component is configured to communicate with the mobile device through a wireless network.

13. The non-transitory computer-readable storage medium of claim 11, further comprising instructions that cause the processor to perform the steps of:
performing an initial synchronization between a user-specific cache and a corresponding user source mailbox based on a set of parameters that identifies a subset of currently existing data in the corresponding user source mailbox; and
simultaneously receiving new mailbox items from the corresponding user source mailbox in real-time during the initial synchronization through a separate synchronization process.

14. The non-transitory computer-readable storage medium of claim 13, further comprising instructions that cause the processor to perform the step of progressively synchronizing the user-specific cache with the corresponding user source mailbox in real-time after the initial synchronization.

15. The non-transitory computer-readable storage medium of claim 14, wherein the step of progressively synchronizing comprises periodically transmitting a mailbox revision number corresponding to the user-specific cache to the collaboration suite server and receiving updated data from the corresponding user source mailbox if the transmitted mailbox revision number does not match a second mailbox revision number maintained by the collaboration suite server for the corresponding user source mailbox.

16. The non-transitory computer-readable storage medium of claim 11, wherein periodically removing data in the user-specific cache is based upon a set of parameters configured to maintain a size of the user-specific cache.

17. The computer system of claim 1, further comprising:
a first synchronizer for synchronizing the subset of data from the corresponding user source mailbox maintained at the collaboration suite server; and
a second synchronizer for synchronizing any new mailbox items received by the corresponding user source mailbox while the first synchronizer is synchronizing the subset of data from the corresponding user source mailbox.

18. The computer system of claim 1, wherein the subset of data is a result of filtering data within the corresponding user source mailbox during the initial synchronization based on one or more filter parameters defined by a user.

* * * * *